Dec. 1, 1936.    R. W. TRYON ET AL    2,062,381
FRANGIBLE SHEAR TYPE SAFETY VALVE
Filed Sept. 14, 1935    2 Sheets-Sheet 1
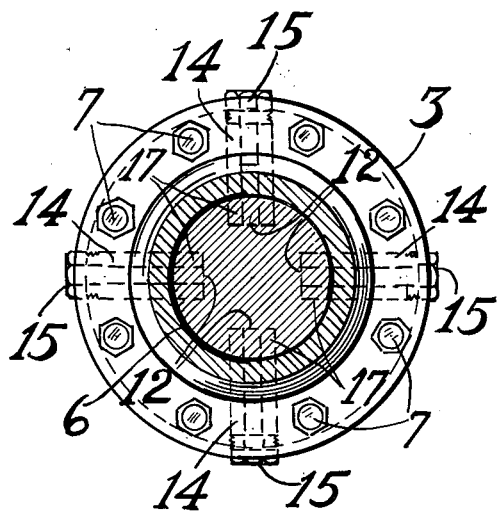
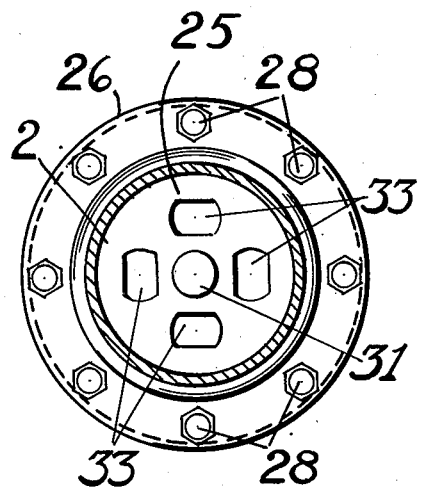
Fig.-2    Fig.-3
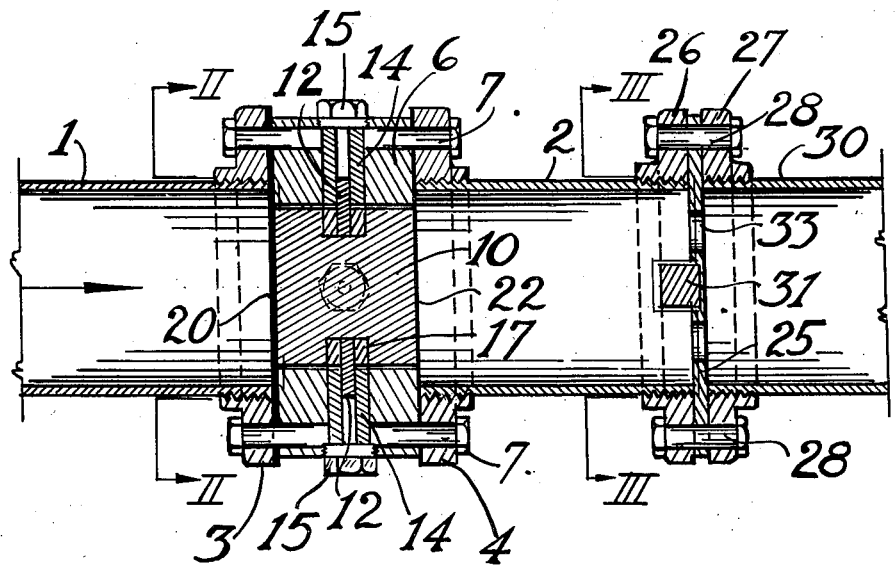
Fig.-1
Richard W. Tryon
George M. Booth   Inventors
By L. L. Young  Attorney Patented Dec. 1, 1936

2,062,381

UNITED STATES PATENT OFFICE 2,062,381

FRANGIBLE SHEAR TYPE SAFETY VALVE

Richard W. Tryon, Cranford, and George M. Booth, Roselle, N. J., assignors to Standard Oil Development Company, a corporation of Delaware Application September 14, 1935, Serial No. 40,616

3 Claims. (Cl. 220—89)

This invention relates to improvements in automatic release devices of the frangible type for containers which may be subjected to excessive pressure.

The invention will be fully understood from the following description taken in connection with the accompanying drawings, in which latter—

Fig. 1 is a longitudinal sectional view through a preferred form of the invention;

Fig. 2 is a transverse sectional view taken along the line II—II of Fig. 1;

Fig. 3 is a transverse sectional view taken along the line III—III of Fig. 1.

Figure 4:
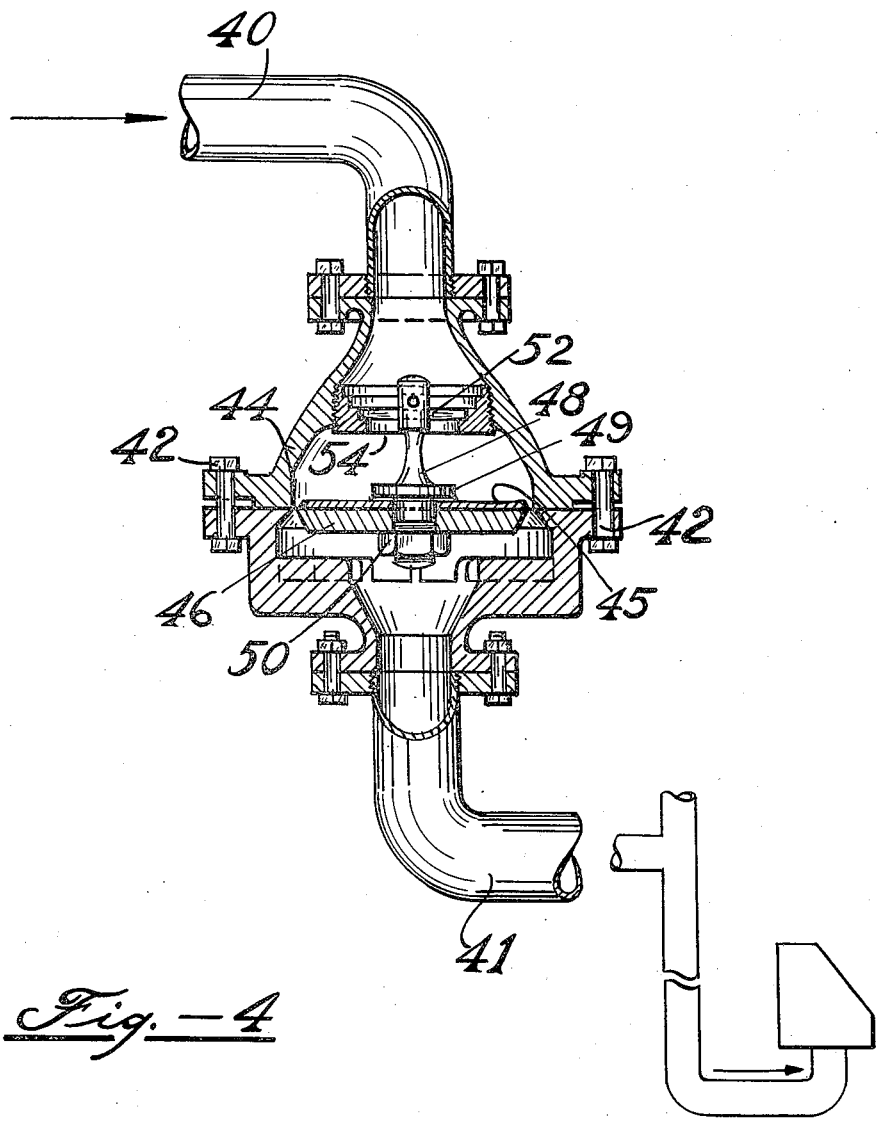
Fig. 4 is a longitudinal sectional view through a modified form of the invention.

Referring particularly to the drawings, a casing is illustrated which comprises an inlet pipe 1 and an outlet pipe 2 the adjoining ends of which are provided with radially outwardly extending flanges 3 and 4 respectively. An annular spacer 6 is secured between the flanges 3 and 4 by means of bolts 7. In the embodiment illustrated, the bore of the spacer 6 is of lesser diameter than the bore of the pipes 1 and 2. The pipe 1 is adapted to contain fluid under pressure from a suitable source (not shown) which is adapted to supply fluid under varying pressures.

Discharge of the fluid through the outlet pipe 2 is prevented up to predetermined pressures through the following arrangement of parts. A frame or piston 10 is disposed in the bore of the spacer 6 and is of a size to have a close fit with the bore of the spacer 6. The frame 10 is held in position by means of shear pins 12 which extend transversely from the spacer 6 into engagement with the frame 10 securing the frame 10 to the spacer 6. Each shear pin 12 is preferably mounted in a bushing 14 extending radially through the spacer 6 and terminating in spaced relation to the outer surface of the spacer 6. The opening for the bushing 14 is closed by a plug 15 which has screw-threaded engagement with the spacer 6. The frame 10 is provided with a plurality of bushings 17 aligned with the bushings 14. The shear pins 12 are carried in the bores of the adjoining bushings 14 and 17.

A flexible, frangible diaphragm 20 extends transversely across the end of the pipe 1 and is secured between the flange 3 and the spacer 6. The diaphragm 20 is preferably made of lead, although it may be made of any other ductile and flexible metal and some of the advantages of the invention will be retained. The strength of the diaphragm or disc 20 should be such as to amply sustain the small bearing load imposed upon the exposed narrow annular area at the periphery of the frame 10, which should be of such strength as to insure immediate failure in shear as soon as the shear pins 12 fail. A similar lead disc or diaphragm 22 extends transversely across the casing on the outlet side of the frame 10 and is secured between the flange 4 and the spacer 6. Preferably the diaphragm 22 is formed only of sufficiently heavy material to prevent leakage of fluid from the pipe 2 into the operative parts between the diaphagms 20 and 22. The diaphragms 20 and 22 are secured in fluid-tight relation to the pipes 1 and 2 respectively and seal the mechanism against corrosion from the fluid contained in the pipe 1 or vapors possibly present in pipe 2.

When the pressure of the fluid in the pipe 1 exceeds the value which the shear pins 12 are designed to withstand, the shear pins are ruptured by the push of the pressure fluid. Immediately after the shear pins 12 break, the diaphragms 20 and 22 being inadequate to withstand alone the full pressure load, will rupture at the margin of the frame 10. Pressure is thereupon relieved by the gas or liquid escaping from the pipe 1 which pushes the frame 10 forwardly toward the discharge end of the outlet pipe 2.

A stop is provided to limit forward movement of the frame 10. The stop comprises a spider 25 which extends transversely across the outlet end of the pipe 2. The spider 25 is secured between radially outwardly extending flanges 26 and 27 which are clamped together by means of bolts 28. The flange 26 is secured to the pipe 2 and the flange 27 is secured to a discharge pipe 30. The spider 25 is provided with an abutment 31 which extends into the pipe 2 and blocks forward movement of the frame 10, thereby maintaining a free passage through holes 33. Flow of the escaping fluid occurs between the frame 10 and the walls of the pipe 2, and through holes 33 which open through the spider 25. If desired, the stopping device can be incorporated as a part of the frame and spacer design.

The down-stream diaphragm or disc 22 is preferably made much more thin than the up-stream diaphragm 20, in which case it serves merely for the purpose of completely sealing the mechanism against corrosion from the down-stream side. With the use of the two diaphragms against internal corrosion and the seal plug or nut 15 against atmospheric corrosion, the device will remain in a 100% operative condition for an indefinite period of service. The application of a proper lubricant on the piston and frame 10 will cut down friction to a negligible amount. The failing shear can be varied by varying the number of shear pins around the periphery of the frame 10, so that any desired number of pins of a given outer diameter could be used. Alternatively, the failing shear can be varied by varying the diameter of the shear pins 12 with an accompanying selection of bushings 14 and 17 having the proper bore to accommodate said shear pins. The strength of the diaphragms 20 and 22 has very little effect upon the failing pressure. The diaphragm 22 can be in the nature of a foil. The up-stream diaphragm 20 should be made of a plastic metal, such as lead, so that its flexibility will permit nearly a 100% transmittal of the fluid load to the shear pins 12. If desired, the upstream edge of the frame 10 and the adjoining edge of the spacer 6 may be given a special shape which will permit ample deflection of the upstream disc 20.

By the construction described, a safety valve is provided which is particularly suitable for corrosive conditions, where reliability and absence of leakage is important. The diaphragm 20 can be of relatively thick cross-section if made of a weak plastic metal and is, therefore, relatively resistant to corrosion. Bulging or creeping is prevented by the backing device. The device works on the principle of double shear, the weak disc 20 made of lead being backed up by frame 10, which in turn is held in position by shear pins which are relatively strong in comparison with the discs 20 and 22. The device is not subject to failure by creep because of the resistance offered by the shear pins 12, which have a strength many times greater than that of the lead discs.

Referring to Fig. 4, a modified form of the device is illustrated, in which the casing comprises tubular sections 40 and 41 which are secured together by means of bolts 42. A disc or diaphragm 44 extends transversely across the casing between the sections 40 and 41. Backing-plates 45 and 46 are secured on opposite sides of the diaphragm 44 by means of a rod 48. The rod 48 is provided with an annular shoulder 49 which cooperates with a nut 50 threaded to the rod to grip the backing-plates 45 and 46 in position. The rod 48 protrudes through a hole in the diaphragm 44. The periphery of each of the backing-plates 45 and 46 is slightly less than the internal diameter of the casing, to permit the fluid pressure to be applied to a limited annular portion of the diaphragm 44. The inlet end of the rod 48 is supported from the walls of the inlet pipe 40 by means of a through-pin 52 of frangible material. The through-pin 52 is supported by a removable bushing 54. Increase of pressure in the inlet pipe 40 will cause failure of the through-pin 52 in double shear. In order to vary the failing pressure, the bushing 54 is preferably a removable bushing which is supplied with various inside diameters, thereby enabling various sizes of shear pins to be used. A wide range of failing pressures can be secured through the selection of various materials for the shear pins having a diversity of shearing strength.

Various changes and alternate arrangements may be made within the scope of the appended claims in which it is our intention to claim all novelty inherent in the art as broadly as the prior art permits.

We claim:

1. A pressure release device, comprising a casing having an inlet for fluid under pressure and having an outlet, a frame extending transversely across the casing between the inlet and outlet, shear pins extending transversely from the casing into engagement with the frame securing the frame to the walls of the casing, flexible frangible diaphragms extending transversely across the casing on opposite sides of the frame and supported by the frame in fluid-tight relation with respect to the casing until increase of fluid pressure on the inlet side of the diaphragms effects rupture of the shear pins and diaphragms to permit escape of fluid through the outlet.

2. A pressure release device, comprising a casing having an inlet for fluid under pressure and having an outlet, a frame extending transversely across the casing, shear pins extending transversely from the casing into engagement with the frame securing the frame to the walls of the casing, flexible frangible diaphragms extending transversely across the casing on opposite sides of the frame and supported by the frame, the diaphragm on the inlet side only of the frame being of greater thickness than the diaphragm on the outlet side of the frame, the diaphragms being in fluid-tight relation with respect to the casing until increase of fluid pressure on the inlet side of the diaphragms effects rupture of the shear pins and diaphragms to permit escape of the fluid through the outlet.

3. A pressure release device, comprising a casing having an inlet for fluid under pressure and having an outlet, a frame extending transversely across the casing between the inlet and outlet, shear pins extending transversely from the casing into engagement with the frame securing the frame to the walls of the casing, a flexible frangible diaphragm extending across the casing on the inlet side of the frame and resting against the frame in fluid-tight relation with respect to the casing until increase of fluid pressure on the inlet side of the casing effects rupture of the shear pins and diaphragm to permit escape of the fluid under pressure toward the outlet, and stop-means extending transversely into the outlet to prevent passage of the frame through the outlet and having openings to permit venting of the fluid through the outlet.

RICHARD W. TRYON.
GEORGE M. BOOTH.